(12) United States Patent
Suzuki

(10) Patent No.: US 9,735,455 B2
(45) Date of Patent: Aug. 15, 2017

(54) METAL-AIR BATTERY

(71) Applicant: TOYOTA JIDOSHA KABUSHIKI KAISHA, Toyota-shi, Aichi (JP)

(72) Inventor: Yushi Suzuki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 556 days.

(21) Appl. No.: 14/301,009

(22) Filed: Jun. 10, 2014

(65) Prior Publication Data
US 2014/0370399 A1    Dec. 18, 2014

(30) Foreign Application Priority Data

Jun. 12, 2013  (JP) .................................. 2013-123771

(51) Int. Cl.
*H01M 12/08*  (2006.01)

(52) U.S. Cl.
CPC ........... *H01M 12/08* (2013.01); *Y02E 60/128* (2013.01)

(58) Field of Classification Search
CPC ............................ H01M 12/08; Y02E 60/128
See application file for complete search history.

(56) References Cited

U.S. PATENT DOCUMENTS

| | | | |
|---|---|---|---|
| 2008/0155813 A1* | 7/2008 | Dopp ................. | H01M 4/8605 29/623.5 |
| 2013/0202974 A1* | 8/2013 | Mizuno .................. | H01M 4/86 429/405 |

FOREIGN PATENT DOCUMENTS

| | | | |
|---|---|---|---|
| JP | S61-156633 A | 7/1986 | |
| JP | A-2-253573 | 10/1990 | |
| JP | WO 2012025975 A1 * | 3/2012 | ............. H01M 4/86 |

OTHER PUBLICATIONS

Machine translation of Japanese Patent Document No. JP S61-156633, published Jul. 16, 1986.*
Yuan, Y and Lee, T.R., "Contact Angle and Wetting Properties", Surface Science Techniques. Ed. G. Bracco, Ed. B. Hoist. Berlin Heidelberg: Springer-Verlag, 2013. 3-4.*

* cited by examiner

*Primary Examiner* — Lilia V Nedialkova
(74) *Attorney, Agent, or Firm* — Oliff PLC

(57) ABSTRACT

A metal-air battery with a high discharge capacity is provided. Discharge capacity can be increased by a metal-air battery that includes an air electrode, a negative electrode and an electrolyte layer, where the electrolyte layer includes a porous separator, and a liquid electrolyte infiltrated in the separator, and a contact angle between the liquid electrolyte and a negative electrode side-face of the separator is smaller than that between the liquid electrolyte and an air electrode side-face of the separator.

2 Claims, 2 Drawing Sheets

METAL-AIR BATTERY

BACKGROUND OF THE INVENTION

Field of the Invention

The present invention relates to a metal-air battery.

Background Art

An air battery that uses oxygen as the cathode active material has advantages such as high energy density, easiness of reducing size and weight, etc. Known air batteries include, for example, metal-air batteries such as a lithium-air battery, a magnesium-air battery and a zinc-air battery. In the metal-air battery, an oxidation-reduction reaction of oxygen is carried out at the air electrode and an oxidation-reduction reaction of metal is carried out in the negative electrode, thus allowing the metal-air battery to charge and discharge.

In general, a metal-air battery has a structure comprising: an air electrode comprising an electroconductive material (e.g., carbonaceous material) and a binder; a negative electrode comprising a negative electrode active material (e.g., metal or alloy); and an electrolyte disposed between the air and negative electrodes. When the electrolyte is a liquid electrolyte, the liquid electrolyte is generally disposed between the air and negative electrodes, in the state of being infiltrated in a separator being an insulating porous body.

An air battery is disclosed in Patent Literature 1, which uses oxygen as the cathode active material, comprises an air electrode and a separator attached to the air electrode, and uses a laminate of a porous film and a woven or non-woven fabric as the separator.

Patent Literature 1: Japanese Patent Application Laid-Open No. H02-253573

BRIEF SUMMARY OF THE INVENTION

As a result of diligent researches, however, the inventor of the present invention has found that the metal-air battery comprising the separator disclosed in Patent Literature 1 has a problem of low discharge capacity.

The present invention was achieved in light of the above circumstances. An object of the present invention is to provide a metal-air battery with a high discharge capacity.

The metal-air battery of the present invention comprises an air electrode, a negative electrode and an electrolyte layer disposed between the air and negative electrodes, wherein the electrolyte layer comprises a separator having a porous structure, and a liquid electrolyte infiltrated in the separator, and wherein a contact angle between the liquid electrolyte and a surface of the separator that faces the negative electrode is smaller than a contact angle between the liquid electrolyte and a surface of the separator that faces the air electrode.

In the present invention, by using the above-described separator, while supplying the liquid electrolyte from the separator to the air electrode, the liquid electrolyte can be also retained in the negative electrode side of the separator; therefore, the discharge capacity of the metal-air battery can be increased.

In the metal-air battery of the present invention, preferably, the contact angle between the liquid electrolyte and the surface of the separator that faces the negative electrode is within a range of 30 to 50 degrees.

In the metal-air battery of the present invention, preferably, the contact angle between the liquid electrolyte and the surface of the separator that faces the air electrode is within a range of 60 to 80 degrees.

In the metal-air battery of the present invention, preferably, the separator is a laminate of two or more porous layers having different contact angles to the liquid electrolyte, and the separator has a structure that the porous layer having a relatively small contact angle to the liquid electrolyte is disposed at a surface that faces the negative electrode and the porous layer having a relatively large contact angle to the liquid electrolyte is disposed at a surface that faces the air electrode.

According to the present invention, the discharge capacity of the metal air battery can be increased.

DETAILED DESCRIPTION OF THE INVENTION

The metal-air battery of the present invention comprises an air electrode, a negative electrode and an electrolyte layer disposed between the air and negative electrodes, wherein the electrolyte layer comprises a separator having a porous structure, and a liquid electrolyte infiltrated in the separator, and wherein a contact angle between the liquid electrolyte and a surface of the separator that faces a negative electrode is smaller than a contact angle between the liquid electrolyte and a surface of the separator that faces an air electrode.

Figure 1:
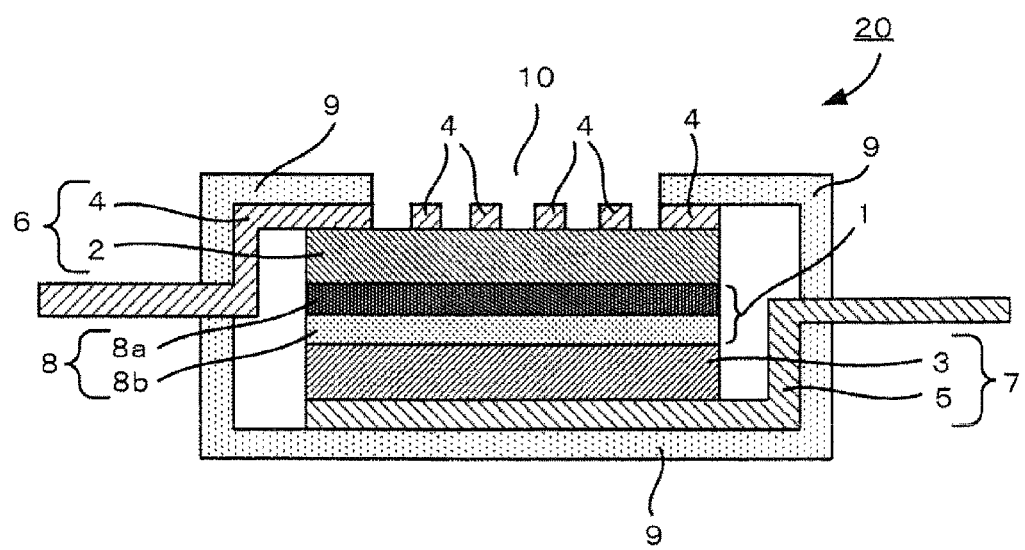
FIG. 1 is a schematic sectional view showing an example of the structure of the metal-air battery according to the present invention.

FIG. 1 is a schematic sectional view showing an example of the structure of the metal-air battery according to the present invention. The structure of the metal-air battery of the present invention is not limited to this example.

A metal-air battery 20 comprises: an air electrode 6 comprising an air electrode layer 2 and an air electrode current collector 4; a negative electrode 7 comprising a negative electrode layer 3 and a negative electrode current collector 5; and an electrolyte layer 1 disposed between the air electrode 6 and the negative electrode 7. The electrolyte layer 1 comprises a separator 8 and a liquid electrolyte (not shown) infiltrated in the separator 8. The separator 8 has a laminated structure in which a first porous body 8a and a second porous body 8b are laminated. The second porous body 8b constituting the negative electrode 7 side-face of the separator 8, has a smaller contact angle to the liquid electrolyte infiltrated in the separator 8, than that showed by the first porous body 8a constituting the air electrode 6 side-face of the separator 8. The air electrode 6, the negative electrode 7 and the electrolyte layer 1 are housed in a battery case 9. In FIG. 1, it looks like that air electrode current collectors 4 are dispersedly arranged at intervals. However, it indicates that a part of the air electrode current collector 4 is in a mesh form. The battery case 9 has oxygen intake vents 10 which open so as to overlap with a part of the mesh portion of the air electrode current collector 4, thereby allowing uptake of oxygen from outside.

In conventional metal-air batteries using a liquid electrolyte, generally, the liquid electrolyte is in a state of being infiltrated in a separator having a porous structure, and situated between negative and air electrodes. In general, many of the ionic liquids that are used in liquid electrolytes for metal-air batteries as a solvent, have high viscosity. Therefore, there is a low wettability between the liquid electrolyte and the separator, and the separator becomes easy to repel the liquid electrolyte.

Since the air electrode layer generally has a porous structure, the air electrode tends to retain much liquid electrolyte therein. When the liquid electrolyte repelled by the separator is supplied to the air electrode, the air electrode is well wetted with the liquid electrolyte. As a result, upon discharge, the air electrode becomes easy to receive metal ions transferred from the negative electrode through the liquid electrolyte, so that the metal ions are uniformly supplied to the air electrode.

Meanwhile, since the negative electrode layer is generally constituted with a metal foil, a metal plate or the like, the negative electrode is difficult to retain the liquid electrolyte therein. Therefore, the liquid electrolyte repelled by the separator tends to flow toward the air electrode side, rather than the negative electrode side, and a shortage of the liquid electrolyte is likely to occur at the negative electrode side region of the separator. As a result, there is a decrease in contact between the negative electrode and the liquid electrolyte, and it is thought that upon discharge, the negative electrode becomes hard to transfer metal ions generated at the negative electrode to the air electrode through the liquid electrolyte, and battery discharge capacity is decreased.

From the above findings, the inventor of the present invention has found that discharge capacity can be increased by, while supplying the liquid electrolyte from the separator to the air electrode, increasing the liquid electrolyte retaining ability in a region at the negative electrode side of the separator, thus having made the present invention.

More specifically, the separator in which the contact angle between the liquid electrolyte and a surface of the separator that faces the negative electrode is smaller than the contact angle between the liquid electrolyte and a surface of the separator that faces the air electrode is used in the present invention. In the metal-air battery of the present invention, the surface of the separator that faces the air electrode has a relatively low wettability with the liquid electrolyte and thus tends to repel the liquid electrolyte. Therefore, it is possible to supply the liquid electrolyte to the air electrode and to wet the air electrode with the liquid electrolyte well. On the other hand, the surface of the separator that faces the negative electrode has a relatively high wettability with the liquid electrolyte and thus is hard to repel the liquid electrolyte. Therefore, it is possible to keep the liquid electrolyte retained in a region at the negative electrode side of the separator. As a result, metal ions can be smoothly transferred between the air and negative electrodes through the liquid electrolyte, and thus the discharge capacity of the battery can be increased.

Hereinafter, components of the metal-air battery of the present invention will be explained.

In the present invention, "metal-air battery" means a battery such that an oxidation-reduction reaction of oxygen, which is a cathode active material, is carried out in the air electrode layer; an oxidation-reduction reaction of a metal is carried out in the negative electrode layer; and metal ions are conducted by the electrolyte disposed between the air electrode layer and the negative electrode layer.

Examples of metal-air batteries include a lithium-air battery, a sodium-air battery, a potassium-air battery, a magnesium-air battery, a calcium-air battery, a zinc-air battery, an aluminum-air battery, an iron-air battery, etc. The metal-air battery of the present invention can be a secondary battery or a primary battery.

[Electrolyte Layer]

The electrolyte layer is retained between the air electrode layer and the negative electrode layer, and it functions to exchange metal ions between the air electrode layer and the negative electrode layer.

The electrolyte layer comprises the separator having a porous structure, and the liquid electrolyte infiltrated in the separator.

(Separator)

The separator functions to retain the liquid electrolyte and to secure insulation of the air electrode and the negative electrode from each other.

From the viewpoint of retaining the liquid electrolyte, the separator has a porous structure. From the viewpoint of securing the insulation, the separator is generally formed of an insulating material.

The porous structure of the separator is not particularly limited, as long as it can retain the liquid electrolyte. For example, there may be mentioned a mesh structure in which constituent fibers are regularly arranged, a non-woven fabric structure in which constituent fibers are randomly arranged, a three-dimensional network structure having independent and/or connected pores, etc.

Examples of materials for forming the separator include insulating materials. For example, there may be mentioned: resins such as polyethylene (PE), polypropylene (PP), polyethylene terephthalate (PET), cellulose, polyamide and acrylic resin; and glass. Of them, preferred are polyethylene and polypropylene. The separator can have a single-layer structure or multi-layer structure.

In the metal-air battery of the present invention, the separator has such a main characteristic feature that the contact angle between the liquid electrolyte and the negative electrode side-face of the separator is smaller than the contact angle between the liquid electrolyte and the air electrode side-face of the separator.

"Contact angle" is a measure of the wettability of a solid surface by a liquid. It is also an angle made by, when a droplet is on and in contact with a solid surface, the solid surface and a tangent drawn on the surface of the droplet from the edge of the same. A solid with a large contact angle has low wettability, and a solid with a small contact angle has high wettability.

Figure 2:
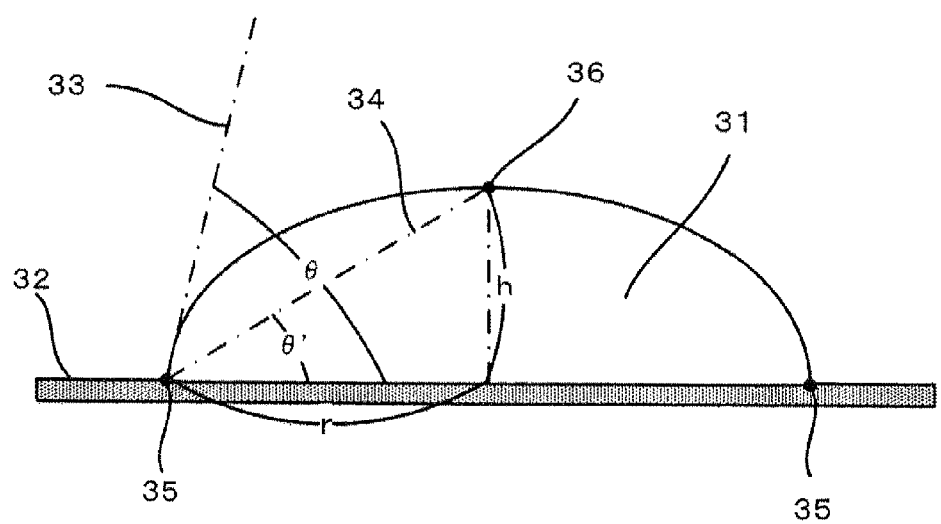
FIG. 2 is a view explaining the principle of contact angle measurement.

In the present invention, the contact angle between the separator surface and the liquid electrolyte can be calculated by common methods such as a drop method. FIG. 2 is a view explaining the principle of contact angle measurement, and it shows a state that a droplet of a liquid electrolyte is on and in contact with a solid surface. In FIG. 2, a contact angle $\theta$ is an angle made by a solid surface 32 and a tangent 33 drawn on the surface of a droplet 31 from an edge point 35 of the same. When an angle made by the solid surface 32 and a straight line 34 is $\theta'$, the straight line 34 connecting the edge point 35 of the droplet 31 and a top 36 of the droplet 31, the following equality holds: contact angle $\theta=2\theta'$. Therefore, $\theta'$ can be obtained by using a radius "r" of the droplet 31 and a height "h" of the droplet 31, and then the contact angle $\theta$ can be calculated.

As the contact angle, there may be used a value calculated by performing a measurement by a drop method or the like only one time, or there may be used the average of values calculated by performing measurements several times at one or more points on the separator surface. The liquid electrolyte used for the contact angle measurement is the liquid electrolyte to be infiltrated in the separator of the metal-air battery.

A concrete value of the contact angle of the separator is not particularly limited, as long as the contact angle between the liquid electrolyte and the negative electrode side-face is smaller than the contact angle between the liquid electrolyte and the air electrode side-face. From the viewpoint of increasing the discharge capacity of the battery, the contact angle between the liquid electrolyte and the air electrode side-face is preferably within a range of 60 to 80 degrees, and the contact angle between the liquid electrolyte and the negative electrode side-face is preferably within a range of 30 to 50 degrees.

As the separator that satisfies the above relationship between the contact angle of the negative electrode side-face and the contact angle of the air electrode side-face, for example, a laminate of porous layers having different contact angles to the liquid electrolyte, can be used. In the present invention, the laminate can be used as the separator, when the porous layer having a relatively small contact angle to the liquid electrolyte is disposed on the negative electrode side-face, and the porous layer having a relatively large contact angle to the liquid electrolyte is disposed on the air electrode side-face.

In the present invention, "porous layer" means a porous body having a porous single-layer structure. The ratio between the thickness of the porous layer constituting the negative electrode side-face and the thickness of the porous layer constituting the air electrode side-face, is not particularly limited.

The laminate of two or more porous layers each of which has different contact angle to the liquid electrolyte, is applied with such a fact that in general, when the porous layers are different in their materials, they are also different with each other in contact angles between the liquid electrolyte and their porous surfaces. By placing the porous layer having a relatively small contact angle to the liquid electrolyte at a surface that faces the negative electrode and placing the porous layer having a relatively large contact angle to the liquid electrolyte at a surface that faces the air electrode, the contact angle between the liquid electrolyte and the surface that faces the negative electrode can be made smaller than the contact angle between the liquid electrolyte and the surface that faces the air electrode. Examples of combinations of porous layers having different contact angles to the liquid electrolyte, include combinations of various kinds of materials selected from the above-mentioned materials for the separator, and preferred is a combination of PE and PP. The separator (laminate) having a multi-layer structure can be a laminate having two or more laminated porous layers composed of the same material, as long as the material of the porous layer on the air electrode side is different from the material of the porous layer on the negative electrode side.

The method of laminating the two or more porous layers is not particularly limited. For example, there may be mentioned methods such as adhesion and welding.

As the separator, there may be also used a porous body in which at least one of the negative electrode side-face and the air electrode side-face has been subjected to a surface treatment which makes it possible to control the contact angle to the liquid electrolyte. At this time, the porous body to be subjected to the surface treatment can be a porous body having a single-layer structure or can be a laminate of two or more porous layers having different contact angles to the liquid electrolyte or having the same contact angle to the liquid electrolyte.

The surface treatment method is not particularly limited, as long as the method can change the contact angle between the porous body surface and the liquid electrolyte before and after the surface treatment. Concrete examples thereof include a chemical treatment using acid or alkali, a corona discharge treatment, a plasma treatment, a mechanical surface roughening treatment and an ultraviolet oxidation treatment.

The thickness of the separator is not particularly limited. For example, it is preferably within a range of 0.1 to 100 μm.

The separator preferably has a porosity of 30 to 90%, more preferably 45 to 70%. When the porosity is too low, there is a tendency to inhibit ion diffusion. When the porosity is too high, there is a tendency to decrease strength.

(Liquid Electrolyte)

As the liquid electrolyte, there may be mentioned an aqueous liquid electrolyte and a non-aqueous liquid electrolyte.

The viscosity of the liquid electrolyte is not particularly limited. However, it is preferably within a range of 0.1 to 200 Pa·s. The content rate of the liquid electrolyte to the separator is not particularly limited. However, it is preferably within a range of 10 to 80%, for example.

The aqueous liquid electrolyte contains an electrolyte salt and water. The electrolyte salt is not particularly limited, as long as it is soluble in water and can exhibit a desired ion conductivity. As the electrolyte salt, generally, there may be used a metal salt that contains metal ions needed to be conducted. For example, in the case of lithium-air battery, there may be used lithium salts such as LiOH, LiCl, $LiNO_3$, $Li_2SO_4$ and $CH_3COOLi$, and mixtures thereof.

The non-aqueous liquid electrolyte contains an electrolyte salt and a non-aqueous solvent.

The non-aqueous solvent is not particularly limited. For example, there may be mentioned the following: ethylene carbonate (EC), propylene carbonate (PC), butylene carbonate (BC), vinylene carbonate, dimethyl carbonate (DMC), ethyl methyl carbonate (EMC), diethyl carbonate (DEC), methyl propyl carbonate, isopropyl methyl carbonate, ethyl propionate, methyl propionate, γ-butyrolactone, ethyl acetate, methyl acetate, tetrahydrofuran, 2-methyltetrahydrofuran, ethylene glycol diethyl ether, ethylene glycol dimethyl ether (DME), acetonitrile (AcN), dimethylsulfoxide (DMSO), dimethoxymethane, 1,3-dimethoxypropane, diethyl ether, tetraethylene glycol dimethyl ether (TEGDME) and mixtures thereof.

As the non-aqueous solvent, there may be also used an ionic liquid. An ionic liquid has a relatively high viscosity. Accordingly, in the case of using a non-aqueous liquid electrolyte containing an ionic liquid, it can be said that the effects provided by the present invention are very high.

Examples of ionic liquids include the following: aliphatic quaternary ammonium salts such as N,N,N-triethyl-N-propylammonium bis(trifluoromethanesulfonyl)amide (TMPA-TFSA), N-methyl-N-propylpiperidinium bis(trifluoromethanesulfonyl)amide (PP13-TFSA), N-methyl-N-propylpyrrolidinium bis(trifluoromethanesulfonyl)amide (P13-TFSA), N-methyl-N-butylpyrrolidinium bis(trifluoromethanesulfonyl)amide (P14-TFSA), N,N-diethyl-N-methyl-N-(2-methoxyethyl)ammonium bis(trifluoromethanesulfonyl)amide (DEME-TFSA); and alkylimidazolium quaternary salts such as 1-methyl-3-ethylimidazolium tetrafluoroborate ($EMIBF_4$), 1-methyl-3-ethylimidazolium bis(trifluoromethanesulfonyl)amide (EMITFSA), 1-allyl-3-ethylimidazolium bromide (AEImBr), 1-allyl-3-ethylimidazolium tetrafluoroborate ($AEImBF_4$), 1-allyl-3-ethylimidazolium bis(trifluoromethanesulfonyl)amide (AEImTFSA), 1,3-diallylimidazolium bromide (AAImBr), 1,3-diallylimidazolium tetrafluoroborate (AAImBF$_4$) and 1,3-diallylimidazolium bis(trifluoromethanesulfonyl)amide (AAImTFSA).

As the non-aqueous solvent, there may be used only one kind of non-aqueous solvent or a combination of two or more kinds of non-aqueous solvents.

The electrolyte salt is soluble in non-aqueous solvents and exhibits a desired conductivity for metal ions. In general, there may be used a metal salt that contains metal ions needed to be conducted. For example, in the case of lithium-air battery, there may be used a lithium salt as the electrolyte salt. Examples of the lithium salt include inorganic lithium salts such as LiOH, LiPF$_6$, LiBF$_4$, LiClO$_4$, LiAsF$_6$, LiCl, LiNO$_3$ and Li$_2$SO$_4$. Also, there may be used organic lithium salts such as CH$_3$CO$_2$Li, lithium bis(oxalate)borate (LiBOB), LiN(CF$_3$SO$_2$)$_2$ (LiTFSA), LiN(C$_2$F$_5$SO$_2$)$_2$ (LiBETA). Of them, preferred is LiTFSA. As the electrolyte salt, there may be used only one kind of electrolyte salt or a mixture of two or more kinds of electrolyte salts.

In the non-aqueous liquid electrolyte, the content amount of the electrolyte salt to the non-aqueous solvent is not particularly limited. However, it can be within a range of 0.1 to 1 mol/kg, for example.

The liquid electrolyte can contain a polymer electrolyte (gel electrolyte) or solid electrolyte in a dispersion state. The polymer electrolyte or solid electrolyte can be appropriately selected, depending on the kind of metal ions to be conducted.

The polymer electrolyte (gel electrolyte) is generally a gelled product obtained by adding a polymer to a non-aqueous liquid electrolyte. For example, the gel electrolyte for a lithium-air battery can be obtained by a gelation process in which a polymer such as polyethylene oxide (PEO), polyacrylonitrile (PAN) or polymethyl methacrylate (PMMA) is added to the above-mentioned non-aqueous liquid electrolyte.

As the solid electrolyte, there may be mentioned a sulfide-based solid electrolyte and an oxide-based solid electrolyte.

Examples of the sulfide-based solid electrolyte include Li$_2$S—P$_2$S$_5$, Li$_2$S—P$_2$S$_3$, Li$_2$S—P$_2$S$_3$—P$_2$S$_5$, Li$_2$S—SiS$_2$, Li$_2$S—Si$_2$S, Li$_2$S—B$_2$S$_3$, Li$_2$S—GeS$_2$, LiI—Li$_2$S—P$_2$S$_5$, LiI—Li$_2$S—SiS$_2$—P$_2$S$_5$, Li$_2$S—SiS$_2$—Li$_4$SiO$_4$, Li$_2$S—SiS$_2$—Li$_3$PO$_4$, Li$_3$PS$_4$—Li$_4$GeS$_4$, Li$_{3.4}$P$_{0.6}$Si$_{0.4}$S$_4$, Li$_{3.25}$P$_{0.25}$Ge$_{0.76}$S$_4$ and Li$_{4-x}$Ge$_{1-x}$P$_x$S$_4$.

Examples of the oxide-based solid electrolyte include lithium phosphate oxynitride (LiPON), Li$_{1.3}$Al$_{0.3}$Ti$_{0.7}$(PO$_4$)$_3$, La$_{0.51}$Li$_{0.34}$Ti0$_{0.74}$, Li$_3$PO$_4$, Li$_2$SiO$_2$ and Li$_2$SiO$_4$.

[Air Electrode]

The air electrode has an air electrode layer that comprises at least an electroconductive material. In the air electrode layer, a reaction of supplied oxygen (active material) and metal ions occurs (e.g., formation, decomposition, and so forth, of metal oxide or metal hydroxide).

The electroconductive material is not particularly limited, as long as it is electroconductive. Examples thereof include a carbonaceous material, a perovskite-type electroconductive material, a porous electroconductive polymer and a metallic porous body. The carbonaceous material can be a carbonaceous material having a porous or non-porous structure. However, preferred is one having a porous structure, because it has a large specific surface area and can provide many reaction sites. Concrete examples of the carbonaceous material having a porous structure include mesoporous carbon. Concrete examples of the carbonaceous material having a non-porous structure include graphite, acetylene black, carbon black, carbon nanotubes and carbon fibers.

The content amount of the electroconductive material in the air electrode layer is, for example, 10 to 99% by mass, preferably 50 to 95% by mass, when the mass of the whole air electrode layer is 100% by mass.

The air electrode layer can contain a catalyst that promotes an electrode reaction at the air electrode, and the catalyst can be carried on the electroconductive material.

Examples of the catalyst include the following: phthalocyanine compounds such as cobalt phthalocyanine, manganese phthalocyanine, nickel phthalocyanine, tin phthalocyanine oxide, titanium phtalocyanine and dilithium phthalocyanine; naphthocyanine compounds such as cobalt naphthocyanine; porphyrin compounds such as iron porphyrin; metal oxides such as MnO$_2$, La$_{0.8}$Sr$_{0.2}$CoO$_3$, CeO$_2$, Co$_3$O$_4$, NiO, V$_2$O$_5$, Fe$_2$O$_3$, ZnO, CuO, LiMnO$_2$, Li$_2$MnO$_3$, LiMn$_2$O$_4$, Li$_4$Ti$_5$O$_{12}$, Li$_2$TiO$_3$, LiNi$_{1/3}$CO$_{1/3}$Mn$_{1/3}$O$_2$, LiNiO$_2$, LiVO$_3$, Li$_5$FeO$_4$, LiFeO$_2$, LiCrO$_2$, LiCoO$_2$, LiCuO$_2$, LiZnO$_2$, Li$_2$MoO$_4$, LiNbO$_3$, LiTaO$_3$, Li$_2$WO$_4$, Li$_2$ZrO$_3$, NaMnO$_2$, CaMnO$_3$, CaFeO$_3$, MgTiO$_3$ and KMnO$_2$; noble metals such as Au, Pt and Ag; and complexes thereof.

The content amount of the catalyst in the air electrode layer is, for example, 0 to 90% by mass, preferably 1 to 90% by mass, when the mass of the whole air electrode layer is 100% by mass.

The air electrode layer preferably contains a binder that fixes the electroconductive material. Examples of the binder include polyvinylidene fluoride (PVDF), polytetrafluoroethylene (PTFE) and styrene-butadiene rubber (SBR).

The content amount of the binder in the air electrode layer is not particularly limited. However, for example, when the mass of the whole air electrode layer is 100% by mass, the binder content is preferably 1 to 40% by mass, particularly preferably 10 to 30% by mass.

Examples of methods for producing the air electrode layer include a method of mixing the materials for the air electrode layer, such as the electroconductive material, and roll-pressing the mixture, and a method of applying a slurry containing the materials for the air electrode layer and a solvent. Examples of the solvent used to prepare the slurry include acetone, ethanol and N-methyl-2-pyrrolidone (NMP). Examples of the slurry applying method include a spraying method, a screen printing method, a gravure printing method, a die coating method, a doctor blade method and an inkjet method. More specifically, the air electrode layer can be formed in such a manner that the slurry is applied to an air electrode current collector or carrier film to be described below, dried and then roll-pressed and cut as needed.

The thickness of the air electrode layer varies depending on the intended use, etc., of the air-metal battery. However, for example, it is within a range of 2 to 500 μm, particularly preferably within a range of 30 to 300 μm.

The air electrode can have an air electrode current collector that corrects current from the air electrode layer. The air electrode current collector can be one having a porous structure or dense structure, as long as it has a desired electron conductivity. However, from the viewpoint of air (oxygen) diffusivity, the air electrode current collector is preferably one having a porous structure, such as a mesh form. Examples of the form of the air electrode current collector include a foil form, a plate form and a mesh (grid) form. The porosity of the current collector having a porous structure is not particularly limited. However, it is preferably within a range of 20 to 99%, for example.

Examples of the material for the air electrode current collector include metallic materials such as stainless-steel, nickel, aluminum, iron, titanium and copper; carbonaceous materials such as carbon fibers and carbon paper; and high electron conductive ceramic materials such as titanium nitride. Of them, preferred is stainless-steel.

The thickness of the air electrode current collector is not particularly limited. However, it is, for example, 10 to 1,000 µm, preferably 20 to 400 µm. A battery case to be described below can also function as the air electrode current collector.

[Negative Electrode]

The negative electrode has a negative electrode layer that comprises at least a negative electrode active material. In general, the negative electrode carries out release of metal ions and, as needed in the case of secondary battery, also carries out storage of metal ions, in response to reactions in the air electrodes.

The metal ions are not particularly limited, as long as they can transfer between the air and negative electrodes and can generate an electromotive force. Concrete examples thereof include lithium ions, sodium ions, potassium ions, aluminum ions, magnesium ions, calcium ions, zinc ions and iron ions.

Concrete examples of the negative electrode active material include alkali metals such as lithium, sodium and potassium; the Group 2 elements such as magnesium and calcium; the Group 13 elements such as aluminum; transition metals such as zinc and iron; and alloy materials, metal oxides, metal sulfides and metal nitrides, all of which comprising these metals. As the negative electrode active material, also, there may be used a carbonaceous material that can store and release metal ions.

As the negative electrode active material of lithium-air battery, there may be used those that are similar to the negative electrode active materials used for general lithium ion batteries. Concrete examples thereof include a lithium metal; lithium alloys such as a lithium-aluminum alloy, a lithium-tin alloy, a lithium-lead alloy, a lithium-silicon alloy; lithium-containing metal oxides such as a lithium titanium oxide; lithium-containing metal nitrides such as a lithium cobalt nitride, a lithium iron nitride and a lithium manganese nitride.

The negative electrode layer contains at least a negative electrode active material. However, as needed, it can contain at least one of an electroconductive material and a binder for fixing the negative electrode active material. For example, when the negative electrode active material is in a foil form, the negative electrode layer can be a layer that contains only the negative electrode active material. When the negative electrode active material is in a powdery form, the negative electrode layer can be a layer that contains the negative electrode active material and at least one of the electroconductive material and the binder. The kind and amount of the electroconductive material used and those of the binder can be the same as those of the above-described air electrode.

The negative electrode can have a negative electrode current collector that collects current from the negative electrode layer. The material for the negative electrode current collector is not particularly limited, as long as it is electroconductive. Examples thereof include stainless-steel, nickel, copper and carbon, and preferred are stainless-steel and nickel. Examples of the form of the negative electrode current collector include a foil form, a plate form and a mesh form. The thickness of the negative electrode current collector is not particularly limited. However, for example, it is 10 to 1,000 µm, preferably 20 to 400 µm. The below-described battery case can also function as the negative electrode current collector.

[Other Components]

The metal-air battery of the present invention generally has the battery case for housing the air electrode, the negative electrode, the electrolyte layer, etc. As the form of the battery case, for example, there may be mentioned a coin form, a flat plate form, a cylinder form and a laminate form. The battery case can be an open-to-the-atmosphere type or closed type. The open type battery case has a structure which has oxygen intake vents for taking oxygen from outside and capable of making at least the air electrode layer sufficiently exposed to the air. The oxygen intake vents can be provided with an oxygen permeable film, a water-repellent film, etc. The closed type battery case can be provided with oxygen (air) inlet and outlet tubes.

Examples of the oxygen-containing gas supplied to the air electrode include air, dry air and pure oxygen. Of them, preferred are dry air and pure oxygen, and particularly preferred is pure oxygen. Especially when the metal-air battery is a secondary battery, the battery capacity can be maintained for long periods by using dry air or pure oxygen.

Each of the air electrode current collector and the negative electrode current collector can have a terminal that functions as a connection to the outside.

EXAMPLES

Hereinafter, the present invention will be explained in more detail, by way of Examples and Comparative Examples. However, the present invention is not limited to these examples.

Example 1

As the electroconductive material and binder, Ketjen Black (ECP600JD manufactured by Ketjen Black International) and PTFE (manufactured by Daikin Industries, Ltd.) were prepared, respectively. These materials were mixed so as to obtain the following ratio: Ketjen Black:PTFE=90% by mass:10% by mass. The mixture thus obtained was roll-pressed and then dried, thereby producing an air electrode layer.

As the air electrode current collector, a 100 mesh of SUS304 (manufactured by Nilaco Corporation) was prepared.

Also, as the negative electrode layer and negative electrode current collector, a lithium metal (manufactured by Honjo Metal Co., Ltd.) and an SUS304 foil (manufactured by Nilaco Corporation) were prepared, respectively. The lithium metal was attached to one surface of the SUS foil, thus producing the negative electrode.

In DEME-TFSA (manufactured by Kanto Chemical Co., Inc.), lithium bis(trifluoromethanesulfonyl)amide (manufactured by Kishida Chemical Co., Ltd.) was dissolved at a concentration of 0.32 mol/kg, thus preparing a liquid electrolyte.

A laminate of a polyethylene porous body and a polypropylene porous body was prepared as the separator, the polyethylene porous body having a contact angle to the liquid electrolyte of 43.7 degrees, and the polypropylene porous body having a contact angle to the liquid electrolyte of 71.3 degrees. In the separator, the polyethylene porous body and the polypropylene porous body had the same thickness (40 µm). The separator was impregnated with the liquid electrolyte, thus producing an electrolyte layer.

As the contact angle between a surface of the separator (porous body) and the liquid electrolyte, an average of values obtained by dropping the liquid electrolyte on some parts of the separator surface and measuring by the drop method, was used. As the contact angle measurement device, automated contact angle mater DM-301 (manufactured by Kyowa Interface Science Co., Ltd.) was used. For measurement of the contact angle, the liquid electrolyte prepared above was used.

The negative electrode current collector, the negative electrode layer, the electrolyte layer, the air electrode layer and the air electrode current collector were laminated in this order starting from the approximately lower side of the gravitational force direction, thus producing a lithium-air battery. The electrolyte layer was situated so that the polyethylene porous body having a contact angle to the liquid electrolyte of 43.7 degrees, is at the negative electrode side; the polypropylene porous body having a contact angle to the liquid electrolyte of 71.3 degrees is at the air electrode side; and the contact angle between the liquid electrolyte and the negative electrode side-face is smaller than the contact angle between the liquid electrolyte and the air electrode side-face.

The lithium-air battery was housed in a battery case (made of aluminum laminated film) having oxygen intake vents. At this time, the lithium-air battery was housed so that the air electrode current collector was situated inside the oxygen intake vents of the battery case.

Comparative Example 1

A lithium-air battery was produced in the same manner as Example 1, except that a laminate of two polypropylene porous bodies having a contact angle to the liquid electrolyte of 71.3 degrees, was used as the separator so that the contact angle between the liquid electrolyte and the negative electrode side-face is equal to the contact angle between the liquid electrolyte and the air electrode side-face. In the separator, the two polypropylene porous bodies had the same thickness (40 μm).

Comparative Example 2

A lithium-air battery was produced in the same manner as Example 1, except that a laminate of two polyethylene porous bodies having a contact angle to the liquid electrolyte of 43.7 degrees, was used as the separator so that the contact angle between the liquid electrolyte and the negative electrode side-face is equal to the contact angle between the liquid electrolyte and the air electrode side-face. In the separator, the two polyethylene porous bodies had the same thickness (40 μm).

Comparative Example 3

A lithium-air battery was produced in the same manner as Example 1, except that the electrolyte layer was situated so that the polypropylene porous body having a contact angle to the liquid electrolyte of 71.3 degrees is at the negative electrode side; the polyethylene porous body having a contact angle to the liquid electrolyte of 43.7 degrees is at the air electrode side; and the contact angle between the liquid electrolyte and the negative electrode side-face is larger than the contact angle between the liquid electrolyte and the air electrode side-face.
(Discharge Test)

A discharge test was performed on the lithium-air batteries of Example 1 and Comparative Examples 1 to 3, in the following conditions. A charge-discharge measurement device (BTS2004 manufactured by NAGANO & Co., Ltd.) was used as the measurement device.

Discharge current density: 0.3 mA/cm$^2$
Atmosphere gas: Pure oxygen (99.9%, manufactured by Taiyo Nippon Sanso Corporation)
Atmosphere temperature and pressure inside the battery: 60° C., 101,325 Pa (1 atmosphere)

Each lithium-air battery was left to stand for three hours in a thermostat chamber at 60° C., before starting the measurement. The discharge test results are shown in FIG. 3.

Figure 3:
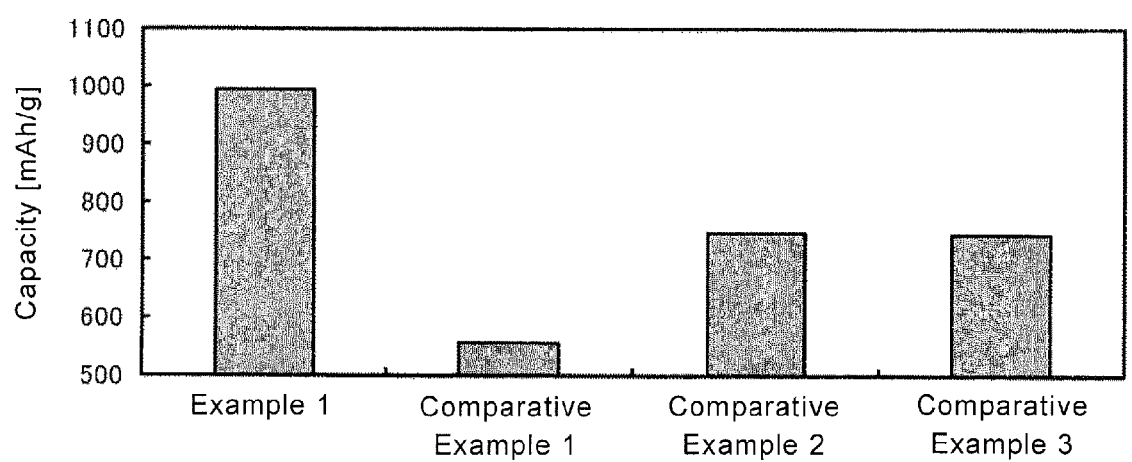
FIG. 3 is a graph comparing the discharge capacities of lithium-air batteries of Example 1 and Comparative Examples 1 to 3.

As shown in FIG. 3, the discharge capacity of Example 1 was increased to about 1.3 to 1.8 times of Comparative Examples 1 to 3.

In Comparative Example 1, the laminate of two polypropylene porous bodies having a contact angle to the liquid electrolyte of 71.3 degrees, was used as the separator. Therefore, the separator surface has low wettability with the liquid electrolyte and tends to repel much liquid electrolyte.

Therefore, although the separator could supply the liquid electrolyte to the air electrode, it is thought that due to low liquid electrolyte retaining ability of a region in the negative electrode side of the separator, a shortage of the liquid electrolyte was caused at the negative electrode side. As a result, it is thought that there was a decrease in mobility of lithium ions from the negative electrode to the air electrode through the liquid electrolyte, and thus the discharge capacity of the battery was extremely decreased.

In Comparative Example 2, the laminate of two polyethylene porous bodies having a contact angle to the liquid electrolyte of 43.7 degrees, was used as the separator. Therefore, the separator surface has relatively high wettability with the liquid electrolyte and is hard to repel the liquid electrolyte.

Therefore, the liquid electrolyte was retained inside the separator, and a shortage of the liquid electrolyte could be inhibited in a region of the negative electrode side of the separator. However, it is thought that the liquid electrolyte was not sufficiently supplied to the air electrode and could not wet the air electrode enough. As a result, it is thought that lithium ions were not smoothly moved from the negative electrode to the air electrode through the liquid electrolyte, and thus the discharge capacity of the battery was decreased.

In Comparative Example 3, contrary to Example 1, the separator was situated so that the polypropylene porous body having a contact angle to the liquid electrolyte of 71.3 degrees, is at the negative electrode side, and the polyethylene porous body having a contact angle to the liquid electrolyte of 43.7 degrees, is at the air electrode side. Therefore, the surface of the separator that faces the negative electrode has low wettability with the liquid electrolyte and tends to repel much liquid electrolyte. On the other hand, the surface of the separator that faces the air electrode has high wettability with the liquid electrolyte and is hard to repel the liquid electrolyte.

Therefore, a region of the air electrode side of the separator retained the liquid electrolyte, so that the liquid electrolyte was not sufficiently supplied to the air electrode and could not wet the air electrode enough. However, it is thought that an excess supply of the liquid electrolyte to the air electrode was inhibited, so that a shortage of the liquid electrolyte was inhibited in a region of the negative electrode side of the separator. As a result, it is thought that lithium ions were not smoothly moved from the negative electrode to the air electrode through the liquid electrolyte, and thus the discharge capacity of the battery was decreased.

In Example 1, the separator was situated so that the polyethylene porous body having a contact angle to the liquid electrolyte of 43.7 degrees is at the negative electrode side; the polypropylene porous body having a contact angle to the liquid electrolyte of 71.3 degrees is at the air electrode side; and the contact angle between the liquid electrolyte and the negative electrode side-face is smaller than the contact angle between the liquid electrolyte and the air electrode side-face. Therefore, the surface of the separator that faces the negative electrode has high wettability with the liquid electrolyte. On the other hand, the surface of the separator that faces the air electrode has low wettability with the liquid electrolyte.

Therefore, it is thought that while the region of the negative electrode side of the separator was kept in a state of retaining the liquid electrolyte, the liquid electrolyte was sufficiently supplied from the separator to the air electrode, and the air electrode was wet with the liquid electrolyte enough. As a result, it is thought that metal ions were smoothly moved between the air electrode and the negative electrode through the liquid electrolyte, and thus the discharge capacity of the battery was increased.

REFERENCE SIGNS LIST

1. Electrolyte layer
2. Air electrode layer
3. Negative electrode layer
4. Air electrode current collector
5. Negative electrode current collector
6. Air electrode
7. Negative electrode
8. Separator
8a. First porous body
8b. Second porous body
9. Battery case
10. Oxygen intake vents
20. Metal-air battery
31. Droplet
32. Solid surface
33. Tangent
34. Straight line
35. Edge point
36. Top

The invention claimed is:

1. A metal-air battery comprising:
an air electrode,
a negative electrode, and
an electrolyte layer disposed between the air and negative electrodes, wherein
the electrolyte layer comprises a separator having a porous structure, and a liquid electrolyte infiltrated in the separator,
a contact angle between the liquid electrolyte and a surface of the separator that faces the negative electrode is within a range of 30 degrees to 50 degrees, and
a contact angle between the liquid electrolyte and a surface of the separator that faces the air electrode is within a range of 60 degrees to 80 degrees.

2. The metal-air battery according to claim 1, wherein
the separator is a laminate of two or more porous layers having different contact angles to the liquid electrolyte, and
the separator has a structure that the porous layer having a contact angle which is within a range of 30 degrees to 50 degrees to the liquid electrolyte is disposed at the surface that faces the negative electrode and the porous layer having a contact angle which is within a range of 60 degrees to 80 degrees to the liquid electrolyte is disposed at the surface that faces the air electrode.

* * * * *